United States Patent [19]
Lieberherr et al.

[11] Patent Number: 5,946,490
[45] Date of Patent: Aug. 31, 1999

[54] AUTOMATA-THEORETIC APPROACH COMPILER FOR ADAPTIVE SOFTWARE

[75] Inventors: Karl Lieberherr, Winchester; Jens Palsberg; Boaz Patt-Shamir, both of Cambridge, all of Mass.

[73] Assignee: Northeastern University, Boston, Mass.

[21] Appl. No.: 08/620,502

[22] Filed: Mar. 22, 1996

[51] Int. Cl.[6] .................................................. G06F 9/45
[52] U.S. Cl. ............................................ 395/707; 395/709
[58] Field of Search .................................. 395/701, 702, 395/704, 705, 706, 707, 708, 709

[56] References Cited

U.S. PATENT DOCUMENTS

| | | | |
|---|---|---|---|
| 4,558,413 | 12/1985 | Schmidt et al. | 364/300 |
| 4,783,730 | 11/1988 | Fischer | 364/200 |
| 4,912,637 | 3/1990 | Sheedy et al. | 364/300 |
| 5,075,847 | 12/1991 | Fromme | 395/700 |
| 5,278,979 | 1/1994 | Foster et al. | 395/600 |
| 5,313,646 | 5/1994 | Hendricks et al. | 395/600 |
| 5,355,317 | 10/1994 | Talbott et al. | 384/468 |
| 5,410,703 | 4/1995 | Nilsson et al. | 395/700 |

OTHER PUBLICATIONS

Proceedings of the European Symposium on Programming, Springer–Verlay Lecture Notes on Computer Science, Apr. 1996.

Lieberherr, J., Karl, Xiao Cun, Customizing adaptive to object–oriented software using grammars, Northeastern University, College of Computer Science, May 1994.

Xavier Nicollin, Joseph Sifakis, and Sergio Yovine, Compiling Real–Time Specifications into Extended Automata, IEEE Transaction On Software Engineering, Sep. 1992.

DongGill Lee, Kwang–Moo Choe, Taisook Han; A description behavior for compilers based on object modeling; Information Processing Letters, Sep. 1993.

Karl J. Lieberherr, Cun Xiao, Object–Oriented Software Evolution, IEEE Transaction On Software Engineering, Apr. 1993.

*Primary Examiner*—Lucien U. Toplu
*Assistant Examiner*—Peter Stecher
*Attorney, Agent, or Firm*—Weingarten, Schurgin, Gagnebin & Hayes LLP

[57] ABSTRACT

A compiler which generates object-oriented code from high level models is disclosed. The compiler uses a class graph to construct a finite intermediate automaton which is used in conjunction with an adaptive program to generate an object-oriented program in a target language. The intermediate automaton enables general case compilation of most combinations of adaptive programs and class graphs. The automaton also enables use of standard minimization techniques which reduce the size of the generated object-oriented code.

10 Claims, 5 Drawing Sheets

TRAVERSAL SPECIFICATION

| Specification D | Pathset$_G$(D) | Source (D) | Target (D) |
|---|---|---|---|
| [A,B] | All paths from A to B in G | A | B |
| $D_1 \cdot D_2$ | Pathset$_G$($D_1$) ·Pathset$_G$($D_2$) | Source ($D_1$) | Target ($D_2$) |
| $D_1 + D_2$ | Pathset$_G$($D_1$) U Pathset$_G$($D_2$) | Source ($D_1$) | Target ($D_1$) |

AUTOMATA-THEORETIC APPROACH COMPILER FOR ADAPTIVE SOFTWARE

FIELD OF THE INVENTION

The present invention relates generally to compilers for computer software, and more particularly to compilers for adaptive software.

BACKGROUND

Adaptive software systems are used in conjunction with object-oriented programming languages to produce object-oriented programs which adapt automatically to changes in class structure. In general this automatic adaptation is possible because adaptive software exists at a higher level of abstraction than the object-oriented language with which it is used. More particularly, the adaptive program is generalized such that little redundancy exists and hence modifications are simplified.

Object orientation has demonstrated that properties such as encapsulation, inheritance and late binding are useful in the discipline of software engineering. However, object-oriented languages suffer from an inherent rigidity which can make software modification and re-use both awkward and laborious. The key feature of most object-oriented languages is that the description of actions is attached to the description of classes. In other words, methods are tightly coupled with classes. While this characteristic property can be useful, it has been observed that changes in the structure of data, i.e., "class definitions," may necessitate re-writing large portions of the action code, i.e, "method definitions." Unfortunately, this is true even if the underlying algorithm remains essentially unchanged.

Adaptive software systems address the above-described limitation in object-oriented languages by supporting a programming style in which class descriptions are only loosely coupled with action code. Changes in class definition thus usually involve a relatively small number of updates in the action code. However, current compilers for adaptive software are not general in the sense that there are certain combinations of adaptive programs and class graphs which the compilers reject. If an adaptive program and a class graph cannot be compiled, then the adaptive program has to be rewritten. This defeats the original motivation of adaptive programs which is the automation of adaptiveness.

SUMMARY OF THE INVENTION

According to the present invention, a compiler for use with an adaptive program and a class graph includes an automata generator which produces a finite deterministic automaton representative of a set of paths from the class graph, wherein the compiler provides an object-oriented program in a target language based on the adaptive program and the automaton. Given an automaton M and a state s, $\text{Outgoing}_M(s)$ denotes the set of all transitions s→s', and $P_M$ is the program in the target language such that method names in $P_M$ are the states of M as follows: if $$s \xrightarrow{c} s'$$

where c is a class name, and $$\text{Outgoing}_M(s') = \left\{ s' \xrightarrow{l_1} mi \;\middle|\; i \in 1 \ldots n \right\},$$

then $P_M(c,s)=\{l_1.m_1 \ldots l_n.M_n\}$, where $l_j<l_k$ for $1 \leq j<k \leq n$; otherwise, if c is a concrete class and s is a state in M, then $P_M(c,s)=\{\ \}$; and otherwise, $P_M(c,s)$ is undefined. The automaton may also be reduced to provide an object-oriented program of reduced size.

The compiler of the present invention provides an adaptive software system with generality and optimality. Unlike previous adaptive software systems which were limited to use with specific combinations of adaptive programs and class graphs, the system of the present invention is capable of compiling most combinations of adaptive programs and class graphs. Hence, the system has the desirable quality of generality. Further, an intermediate automaton allows use of reduction algorithms to reduce the size of the generated object-oriented program. The system thus has optimality in the sense that it generates an object-oriented program of reduced size.

The compiler of the present invention also indirectly enables utilization of various advantages associated with adaptive software. For example, adaptive software allows for shorter programs by focusing on core actions and reducing redundancy. Further, adaptive software allows development of application-oriented, domain-specific reusable libraries which can be reused in similar projects without added reusability cost. By providing a generalized compiler, the present invention extends these advantages to a wider variety of applications.

BRIEF DESCRIPTION OF THE DRAWING

Other features and advantages of the invention will become apparent in light of the following detailed description of the drawing in which.

DETAILED DESCRIPTION OF THE DRAWING

Figure 1:
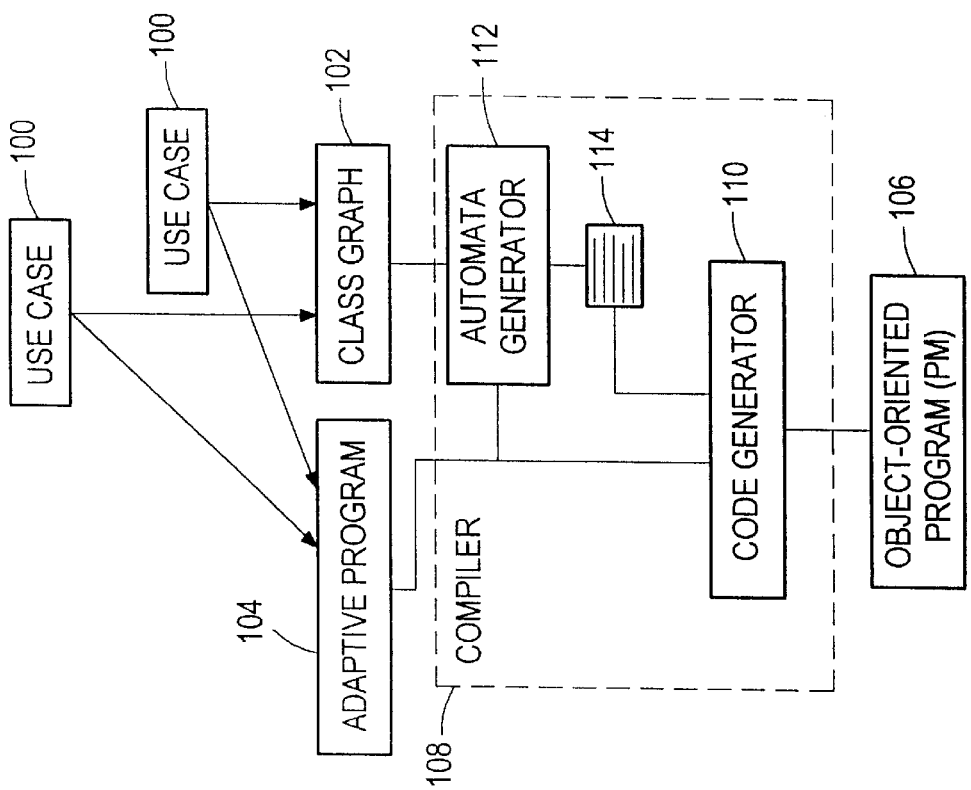
FIG. 1 is a block diagram of an adaptive software system.

FIG. 1 is a block diagram which illustrates an adaptive software system for compiling an adaptive program and a class graph to produce a desired object-oriented program in accordance with the present invention. The adaptive software system includes use cases 100, a class graph 102, an adaptive program 104, an object-oriented program 106 and a compiler 108 having a code generator 110 and an automata generator 112 which generates an automaton 114.

The adaptive software system achieves adaptability by separating the object oriented program 106 into two parts: the class graph 102 which defines objects, and the adaptive program 104 which defines operations. The class graph and adaptive program are then compiled to create the desired object-oriented program 106. Modification of the object-oriented program can therefore be accomplished by making relatively simple changes in the class graph or adaptive program and re-compiling.

The combination of the adaptive program 104 and the class graph 102 contains all of the information required to generate the object-oriented program 106. It should be noted however that the manner in which the class graph and adaptive program are represented is not critical to the present invention, e.g., the class graph could be represented by strings. Operations that are to be applied to objects are defined in the adaptive program and desired traversals are generated from the class graph. In practice, the adaptive program 104 can be produced from informal specifications. First, requirements are written in the form of use cases 100. A use case is an English language description of how the program 104 should react in a specific situation. The class graph 102 is derived from the use cases 100. Propagation patterns are also developed from the use cases. The propagation patterns are designed to have minimal dependency on the class graph.

In order to provide generality and optimality, the automaton 114 which represents the class graph 102 and adaptive program 104 is produced by the automata generator 112 for use by the code generator 110. More particularly, the automaton enables general case compilation of most combinations of adaptive programs and class graphs. Use of automata also enables use of standard minimization techniques which reduce the size of the generated object-oriented program 106.

Figure 2:
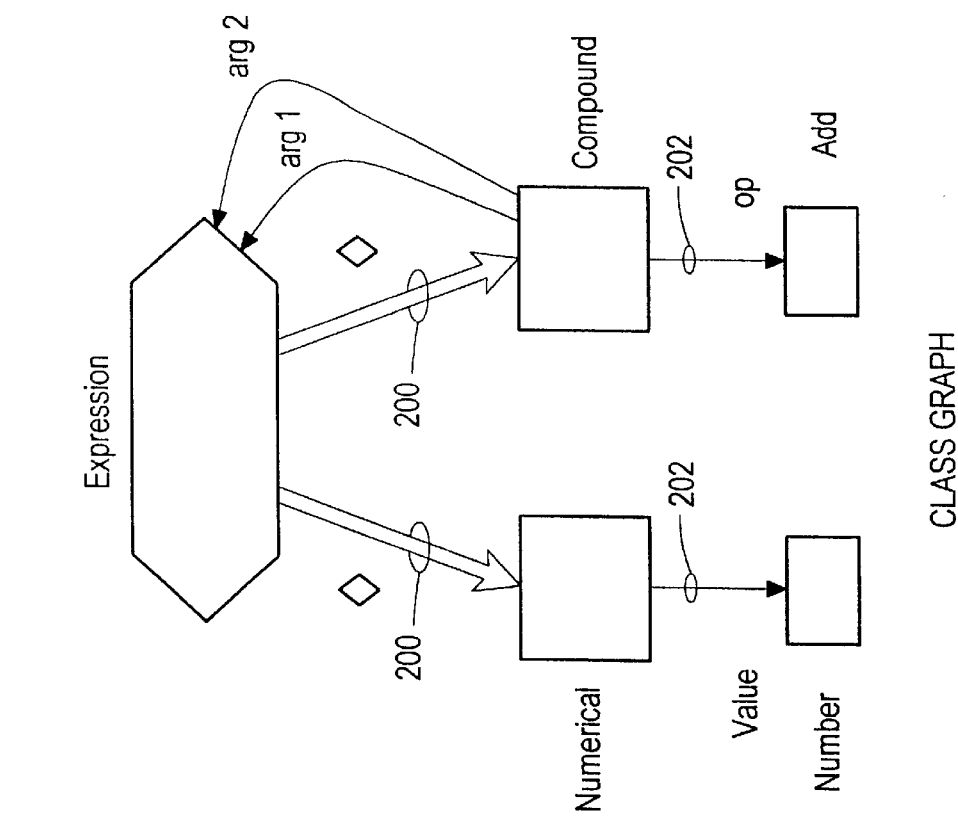
FIG. 2 illustrates the exemplary class graph of FIG. 1.

FIG. 2 illustrates another exemplary class graph 102 of FIG. 1. The class graph is a labeled directed graph which represents the static class structure of the program 106 (FIG. 1) and expresses the "has-a" and "is-a" relations among classes. Subclass edges 200 represent is-a type relations and construction edges 202 represent has-a type relations. Generally, a directed graph is a pair (V,E) where V is a set of nodes, E is a set of edges and $E \subseteq V \times V$. If $(v_1, v_2) \in E$, then $v_1$ is the source, and $v_2$ is the target of $(v_1, v_2)$. Each edge is labeled by an element from $N \cup \{\diamond\}$. An edge (u,v) with label $\diamond$ is written $$u \stackrel{\diamond}{\to} v \cdot \text{Edges } u \stackrel{\diamond}{\to} v$$

are subclass edges 200, which indicate that v is a subclass of u. If $l \in N$, then the edge $$u \stackrel{l}{\to} v$$

indicates that the class represented by u has an instance variable with name l and with a type represented by v. Such an edge is called a construction edge 202. The construction edge $$u \stackrel{l}{\to} v$$

indicates that the l-component of objects of class u is an object of class v.

Figure 2A:
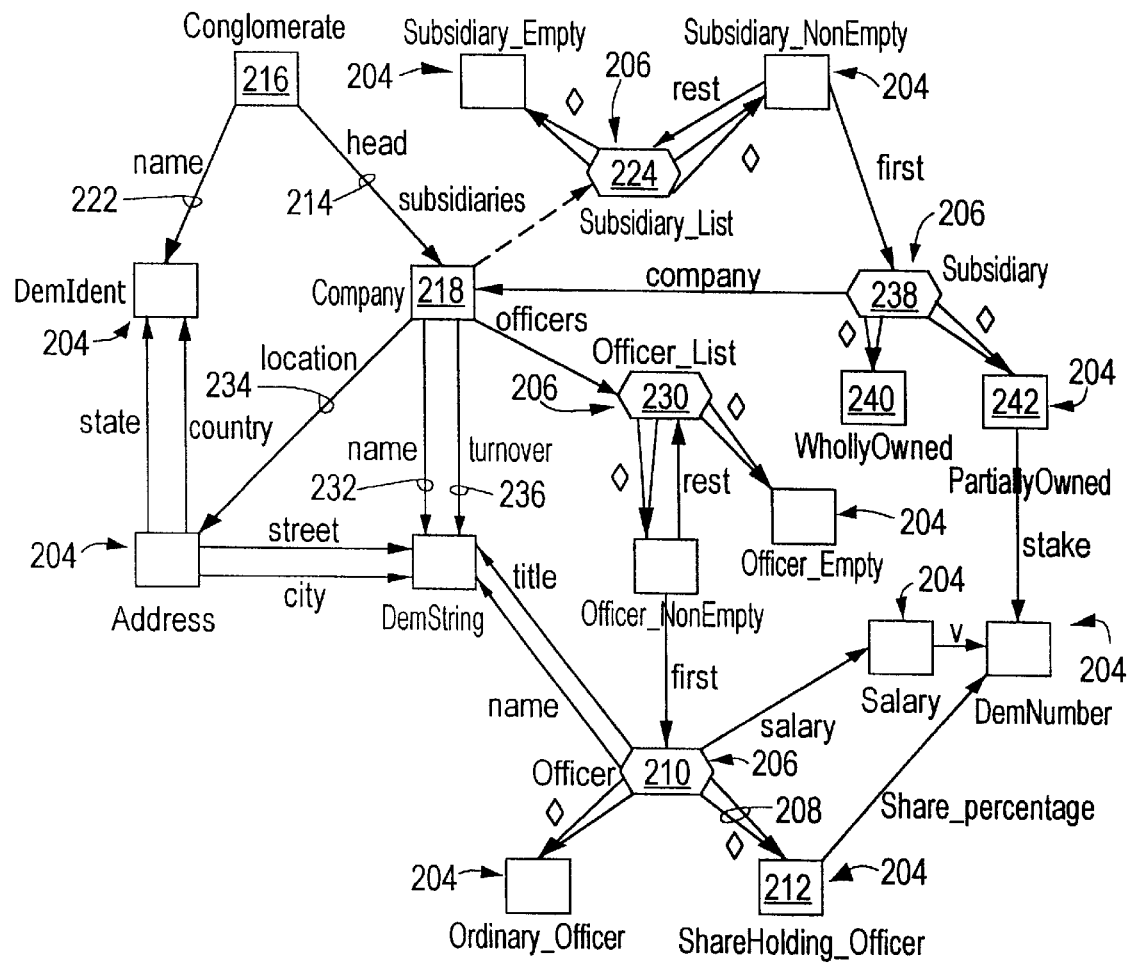
FIG. 2A is an alternative exemplary class graph.

A more complex exemplary class graph is illustrated in FIG. 2A. Two types of classes are employed by the graph: construction classes 204 (illustrated as □) which are used to instantiate objects with a fixed number of parts, and alternation classes 206 which are abstract classes. Together, the classes and edges describe object structure. For example, the subclass edge $$\text{Officer} \stackrel{\diamond}{\to} \text{ShareHolding\_Officer}$$

208 means that class Officer 210 is a super class of class ShareHolding_Officer 212, and the construction edge $$\text{Conglomerate} \stackrel{\text{heat}}{\longrightarrow} \text{Company}$$

214 means that class Conglomerate 216 has a data member called head of type Company 218. The Company class 218 optionally contains a subsidiary list class 224 and it contains a list of Officer class 230 and has data members called a name 232, a location 234, and a turnover 236. A Subsidiary object 238 is either an instance of WhollyOwned 240 or an instance of PartiallyOwned 242 and contains a Company object 218. An Officer object 210 is either an instance of ShareHolding_Officer 212 or of Ordinary_Officer 244.

Figure 3:
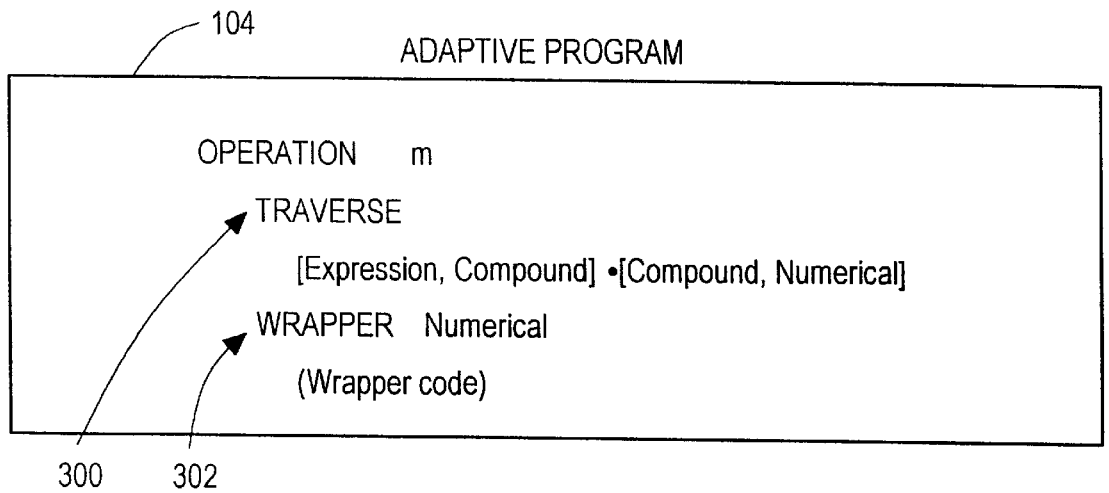
FIG. 3 illustrates the exemplary adaptive program of FIG. 1.

FIG. 3 illustrates an exemplary adaptive program 104 of FIG. 1. The adaptive program includes a traversal specification 300 and wrapper code 302. The traversal specification selects objects according to their classes. A traversal specification of the form [A,B] is interpreted as "all objects of class B which are subobjects of an object of class A." The wrapper code associates actions with selected objects. Hence, with the proper wrapper code attached to class B, the interpretation of the adaptive program could be "for each object of class B contained in the class A object, add its value to a sum variable."

Figure 3A:
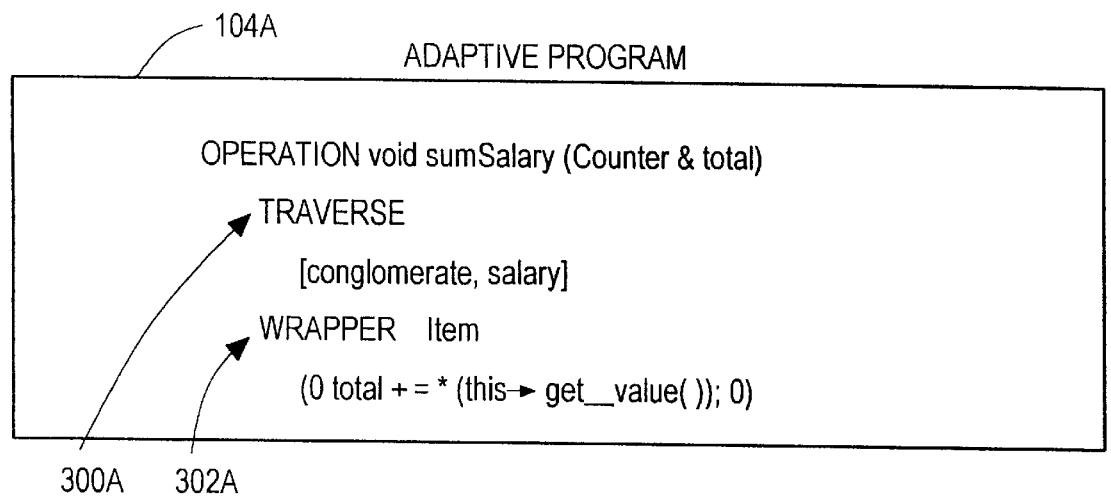
FIG. 3A is an alternative exemplary adaptive program.

An exemplary adaptive program 104A is illustrated in FIG. 3A. Compiling the adaptive program 104A with the class graph of FIG. 2A provides an object oriented program which computes total salary expenditure for the Conglomerate object. More particularly, as described in the traversal code 300A and the wrapper code 302A, the program will return the sun of all Salary objects in the Conglomerate object. It should be appreciated that the adaptive program is modifiable for use in other tasks. For example, if the desired object oriented program were directed to computing the total weight of an object Airplane (for which a class graph exists) the adaptive program of FIG. 3A might be modified as follows: change SumSalary to SumWeight, change Conglomerate to Airplane, and change Salary to Weight. The program will then return the sum of all Weight objects in the Airplane object.

Referring again to FIG. 3, the traversal specification 300 denotes a set of paths to be traversed at run time. The traversal specification is an expression generated by the grammar $D ::= [A,B] | D \cdot D | D + D$, where A and B are class names. Given a graph G=(V, E) with edge labels $N \cup \{\diamond\}$, a path is a sequence $v_o l_1 v_1 l_2 \ldots l_n v_n$ where $v_o, \ldots, v_n \in V$, and for all $0 \leq i < n$, $$v_i \stackrel{l_i}{\to} v_{i+1} \in E,$$

and $l_1, \ldots, l_n \in N \cup \{\diamond\}$, wherein the terms $v_o$ and $v_n$ are the source and target of the path, respectively. If $p_1 = v_o \ldots v_i$ and $p_2 = v_i \ldots v_n$, the concatenation can be defined as $p_1 \cdot p_2 = v_o \ldots v_i \ldots v_n$. It will be appreciated that $p_1 \cdot p_2$ contains only one copy of the meeting point $v_i$. Letting $P_1$ and $P_2$ be a set of paths such that all paths in $P_1$ have target v, and all paths of $P_2$ have source v, then: $P_1 \cdot P_2 = \{p | p = p_1 \cdot p_2 \text{ where } p_1 \in P_1 \text{ and } p_2 \in P_2\}$.

The paths of interest are those obtained by removing prefixes containing only $\diamond$-labeled edges. Reduce (R) is the set of paths obtained by removing all $\diamond$ prefixes from each path in R, where R denotes an arbitrary set of paths. For a path set R, Reduce(R)=$\{v_n \ldots v_{n+m} | \exists v_0, v_1 \ldots v_{n-1}$ such $v_0 \diamond v_1 \diamond \ldots \diamond v_n \ldots v_{n+m} \in R\}$. Head (R) is defined to be the set of all nodes which are sources of paths in Reduce (R), i.e., Head (R)=$\{v_0 | v_0 \ldots v_n \in$ Reduce (R)$\}$. For a node u, select (R, u) is defined to be the set of suffixes of paths in R that start with v after skipping a leading $\diamond$-labeled prefix. Select (R, u)=$\{v_0 \ldots v_n | v_0 \ldots v_n \in$ Reduce (R), $v_0$=u$\}$. Finally, Car (R, u) is defined to be a set of the first edges in select (R, v), and for a given label l, Cdr (l, R, u) is defined to be the set of tails of Select (R, v) where the head has label l. That is, $$Car(R, u) = \left\{v_0 \xrightarrow{l_1} v_1 \,\middle|\, v_0 v_1 l_1 \ldots v_n \in \text{Select}(R, u)\right\},$$

and Cdr (l, R, u)=$\{v_1 \ldots v_n | v_0 l_1 v_l \ldots v_n \in$ Select(R, u),$l_1$=l$\}$.

Figures 4, 5:
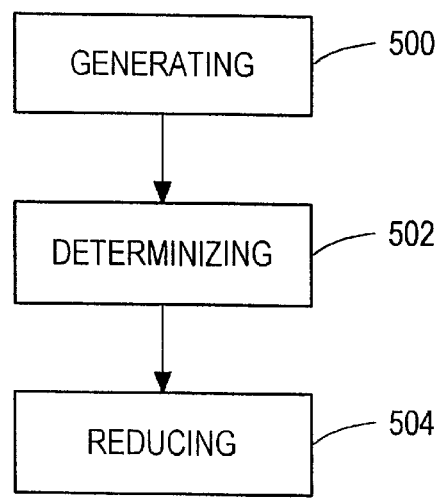
FIG. 4 illustrates the semantics of traversal specifications.
FIG. 5 is a block diagram of the automaton generation process.

The semantics of traversal specifications are shown in FIG. 4. A traversal specification must be well formed in order to be meaningful. A traversal specification is well formed if (1) it determines a source node and a target node, (2) each concatenation has a "meeting point," and (3) each union of a set of paths preserves the source and the target. The predicate WF is defined in terms of two functions Source and Target, given in FIG. 4, and the following recursive definition.

$$WF([A, B]) = \text{true}$$

$$WF(D1 \cdot D2) = WF(D1) \wedge WF(D2) \wedge \text{Target}(D1) =_{nodes} \text{Source}(D2)$$

$$WF(D1 + D2) = WF(D1) \wedge WF(D2) \wedge$$

$$\left(\text{Source}(D1) =_{nodes} \text{Source}(D2)\right) \wedge \left(\text{Target}(D1) =_{nodes} \text{Target}(D2)\right)$$

If D is well formed, then PathSet$_\Phi$(D) is a set of all paths in $\Phi$ from Source(D) to Target(D).

The manner in which the traversal specification denotes path sets in the class graph is important to the performance of the generated program. To illustrate, paths can be denoted as strings, and the traversal specification D from FIG. 3 and the class graph from FIG. 2 examined in light thereof. Using the standard notation of regular expressions and denoting the language defined by a regular expression E as L(E), it follows that: PathSet$_G$(D)=L(Expression ($\diamond$ Compound (arg1+arg2)Expression)+$\diamond$ Numerical). Turning back to FIG. 1, the compiler will reject the adaptive program and class graph of FIG. 2 and FIG. 3, respectfully, if an automaton is not employed to generate the program. More particularly, the program generated will be as follows.

```
CLASS Compound              CLASS Numerical
   VAR arg1, arg2; Expression
   METHOD m                    METHOD m
      arg1.m;arg 2.m              Wrapper code here
   END                         END
END                         END
```

The problem with this program is that it fails to correctly handle objects that are simply numerical. Every outgoing construction edge causes generation of a method invocation. When the message m is sent directly to the numerical, the wrapper code is executed even though a compound object has not been processed first.

The automaton solves the above described problem by providing a more appropriate representation of the set of paths in the class graph. Automaton generation involves a three-step process which is shown in FIG. 5. The steps are generating 500 a non-deterministic automaton, determinizing 502 the automaton and reducing 504 the determinized automaton. A new, simpler semantics is employed in which all $\diamond$-labels are removed before traversal begins.

The functions which transform path sets into strings (words) while deleting abstract classes are defined below. A word is defined to be a sequence $v_0 l_1 v_{12} \ldots v_n$ where $v_0 \ldots, v_{n-1}$ are names of concrete classes, $l_1, \ldots, l_{n-1} \in N$, and $v_n$ is the name of either an abstract or a concrete class. The function SimplifyPath which maps paths to words is defined as follows: given a path p, the function SimplifyPath is the string obtained from the path by removing all $\diamond$-labels and abstract class names, except for the last class name in path. If p is a path in a flat class graph, then SimplifyPath(p) is a word. This is true because in a flat class graph every outgoing edge of a concrete class is a construction edge. Thus, in a path, except for the last class, a class is abstract if and only if the following label is $\diamond$. Finally, for a path set R, Simplify(R) is defined to be $\{$SimplifyPath(p)$|$p$\in$R$\}$.

Given a class graph $\Phi$ and well-formed traversal specification D, Simplify(PathSet$_\Phi$(D)) will be represented by a finite state non-deterministic automaton. First, automata are constructed for traversal specifications of the form [A,B], wherein if V is a set, then $V_{in}$ and $V_{out}$ are two distinguished copies of V where elements are subscripted by in and out, respectively. If $\Phi$=(V,E) is a class graph, and A, B$\in$V, then Auto$\Phi$(A,B) is a finite state automaton defined as follows:

the set of states is $V_{in} \cup V_{out}$;

the alphabet is V$\cup$N$\cup\{\diamond\}$;

the start state is $A_{in}$;

there is just one accept state $B_{out}$; and the transitions are $$v_{in} \xrightarrow{v} v_{out} \text{ if } v \in V$$

$$u_{out} \xrightarrow{l} v_{in} \text{ if } u \xrightarrow{l} v \in E \text{ where } l \in N \cup \{\diamond\}.$$

In order to construct automata for an arbitrary directive, three operations on automata are defined as follows wherein L(M) denotes the language accepted by an automaton M:

If $M_1, M_2$ are automata, then $M_1+M_2$ is the automaton such that L($M_1+M_2$)=L($M_1$)$\cup$L($M_2$). $M_1+M_2$ can be computed in constant time by standard methods.

If $M_1, M_2$ are automata, then $M_1 \cdot M_2$ is the automaton defined as follows. The states of $M_1 \cdot M_2$ are the disjoint union of the states of $M_1$ and the states of $M_2$, together with a fresh state m. The start state of $M_1 \cdot M_2$ is the start state of $M_1$. The accept states of $M_1 \cdot M_2$ are the accept states of $M_2$. The transitions of $M_1 \cdot M_2$ are the union of the transitions of $M_1$ and the transitions of $M_2$, together with $\epsilon$-transitions from each final state of $M_1$ to m, and $\epsilon$-transitions from m to each state in $M_2$ which can be reached from the start state of $M_2$ by a sequence of $\epsilon$-transitions followed by one non-$\epsilon$-transition. Hence, $M_1 \cdot M_2$ can be computed in linear time.

If M is an automaton which only accepts paths in some class graph, then Simplify(M) is the automaton defined as follows. The states of Simplify(M) are those of M together with a fresh state s. The start state of Simplify (M) is that of M. The only accept state of Simplify (M) is s. The transitions of Simplify(M) are defined as follows.

$u \xrightarrow{\epsilon} v$ is a transition of M;

$u \xrightarrow{a} v$ if $u \xrightarrow{a} v$ is a transition of M, where $a \in N \cup \{u | \neg \text{Abstract}(u)\}$;

$u \xrightarrow{\epsilon} v$ if $u \xrightarrow{a} v$ is a transition of M, where $a \in \{\lozenge \cup \{u | \text{Abstract}(u)\}\}$; and $u \xrightarrow{l} s$ if there is a path in M from u to an accept state of M which consist of one l-transition followed by a sequence of ε-transitions.

It will be appreciated that Simplify(M) can be computed in linear time. For a well-formed specification D and a class graph Φ, $A_\Phi(D)$ is defined recursively as follows.

$A_\Phi([A,B]) = \text{Auto}_\Phi(A,B)$ $A_\Phi(D1,D2) = A_\Phi(D1) \cdot A_\Phi(D2)$ $A_\Phi(D1+D2) = A_\Phi(D1) + A_\Phi(D2)$ Since $A_\Phi(D)$ accepts precisely PathSet$_\Phi(D)$, and it can be computed in $O(|D||\Phi|)$ steps, an automaton can be computed which accepts Simplify(PathSet$_\Phi(D)$) in polynomial time. However, the resulting automaton is non-deterministic, and thus cannot be used directly to guide traversals. The next step in the construction is therefore determinizing 502 the automaton accepting Simplify(PathSet$_\Phi(D)$) using standard subset construction. Finally, the automaton is reduced using an appropriate reduction algorithm.

Figure 6:
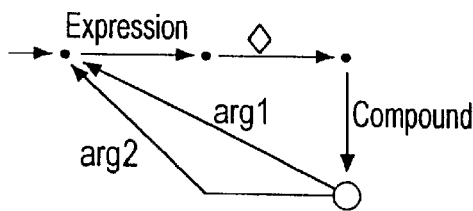
FIGS. 6–10 illustrate intermediate steps involved in computing a minimal deterministic automaton.
Figure 7:
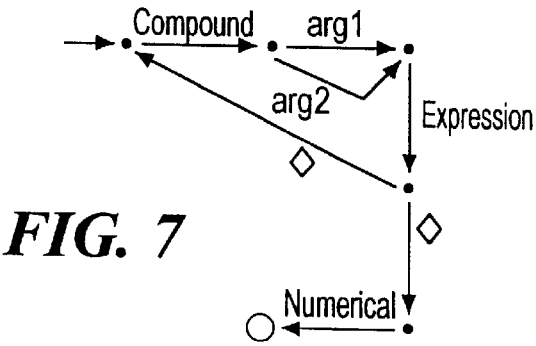
Figure 8:
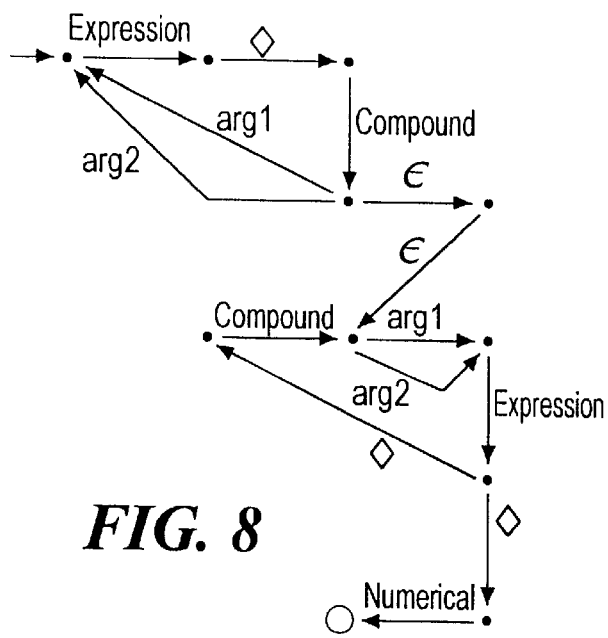
Figure 9:
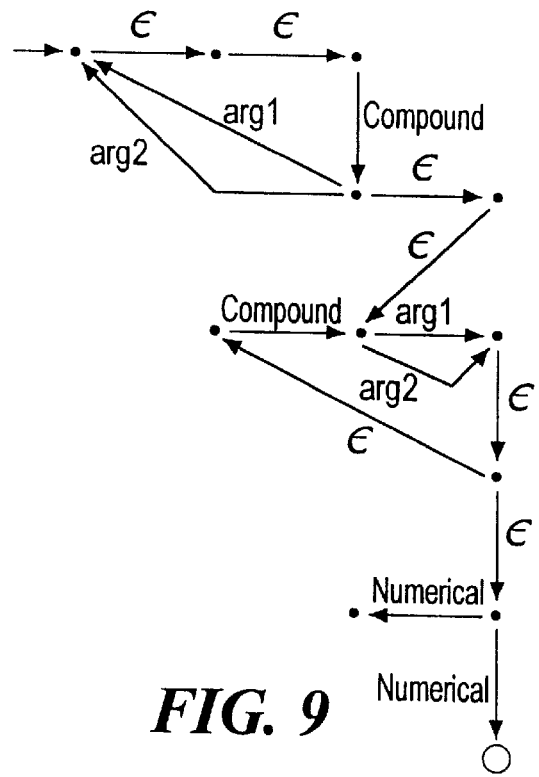
Figure 10:
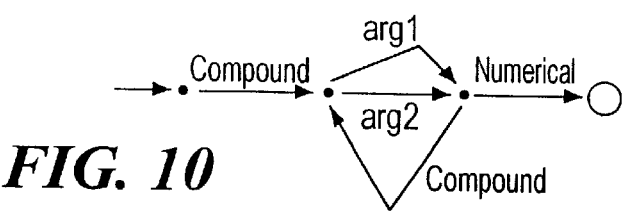

FIGS. 6–10 further illustrate the intermediate steps involved in computing a minimal deterministic automaton for the class graph of FIG. 2. In FIG. 2, $D=D_1 \cdot D_2$, where $D_1$=[Expression, Compound] and $D_2$=[Compound, Numerical]. Automata $A_G(D_1)$ and $A_G(D_2)$ are shown in FIG. 6 and FIG. 7, respectively. An automaton $A_G(D)$ and an automaton Simplify($A_G(D)$) formed by removing $\lozenge$-labels are shown in FIG. 8 and FIG. 9, respectively. A minimal deterministic automaton formed by collapsing the ε-transitions is shown in FIG. 10. The minimal deterministic automaton accepts Simplify(PathSet$_\Phi(D)$).

Referring again to FIG. 1, the code generator 110 provides code in response to the adaptive program 104 and the minimal deterministic automaton 114. Given an automaton M and a state s, Outgoing$_M$(s) denotes the set of all transitions s→s'. For an automaton M, $P_M$ is defined to be a program in the target language wherein method names in $P_M$ are the states of M as follows.

If $s \xrightarrow{c} s'$ where c is a class name, and $\text{Outgoing}_m(s') = \left\{ s' \xrightarrow{l_i} m_i \mid i \in 1 \ldots n \right\},$ then $P_M(c,s) = \{l_1.m_1 \ldots l_n.m_n\}$, where $l_j < l_k$ for $1 \leq j < k \leq n$.

Otherwise, if c is a concrete class and s is a state in M, then $P_M(c,s) = \{ \}$.

Otherwise, $P_M(c,s)$ is undefined.

In a target language with inheritance, the empty methods can be placed in superclasses, thus reducing code size further. Given the deterministic automaton shown in FIG. 10, the code generator emits the following code.

| CLASS Compound | CLASS Numerical |
|---|---|
| VAR arg1, arg2: Expression | |
| METHOD m | METHOD m |
| arg1.n; arg2.n | - No code here |
| END | END |
| METHOD n | METHOD n |
| arg1.n;arg2.n | - Wrapper code here |
| END | END |
| END | END |

The two method names (m and n) are employed to distinguish if a Numerical object is reached via a Compound object or not. In the former case (method n), the wrapper code is executed, in the latter case (method m), it is not.

It should be understood that the invention is not limited to the particular embodiment shown and described herein, and that various changes and modifications may be made without departing from the spirit and scope of this novel concept as defined by the following claims.

What is claimed is:

1. A compiler for providing software code in a target object-oriented language from an adaptive program and a class graph, comprising:
   an automata generator operative to provide a traversal automaton representative of a selected set of paths in the class graph, said automata generator providing said traversal automaton from a traversal specification in the adaptive program and the class graph, wherein
      said traversal automaton is a non-deterministic finite state automaton which is transformed into a minimal deterministic finite state automaton for the purpose of code generation and said automaton is a generalized automaton which contains state transitions of the form:
         {n}x where n is a set of numbers and x is a part to be traversed, set n controlling the circumstances under which x is traversed such that a source s* and target t* are added to said traversal automaton and further wherein all nodes are marked which are reachable from s* and from which t* is reachable; and
   a Traversal Method Algorithm ("TMA") operative to associate said traversal automaton with operations defined in the adaptive program, thereby translating said adaptive program into a traversal-state-passing program in the target language,
   whereby the traversal specification of the adaptive program does not need to satisfy constraints with respect to the class graph, and hence said compiler is a general compiler.

2. The compiler of claim 1 wherein the traversal specification of said adaptive program is a general directed graph with a constraint map, wherein a constraint map assigns class graph element exclusion constraints to the edges of the traversal specification.

3. The compiler of claim 1 wherein said class graph corresponds to a Unified Modeling Language class diagram or a Demeter class dictionary.

4. The compiler of claim 1 wherein said target language is an object-oriented target language selected from the group consisting of Java, C++, SmallTalk and CLOS.

5. The compiler of claim 2 wherein the traversal automaton is constructed by making k copies of the class graph, where k is the number of edges in the traversal specification.

6. The compiler of claim 2 wherein tokens are used as parameters to the traversal methods algorithm, and each token is a node in the traversal automaton.

7. The compiler of claim 6, wherein each hop in the class object graph updates the tokens based on the edges in the traversal automaton.

8. The compiler of claim 7, wherein the TMA is used to generate target code.

9. The compiler of claim 3 wherein said code generator is operative to provide a finite state automaton $\text{Auto}\Phi(A,B)$, wherein $V_{in}$ and $V_{out}$ are two distinguished copies of V where elements are subscripted by in and out, respectively, $\Phi=(V,E)$ is a class graph, and A, B$\in$V, such that $\text{Auto}\Phi(A,B)$ includes:

a set of states being $V_{in} \cup V_{out}$;

an alphabet being $V \cup N \cup \{\Diamond\}$;

a start state being $A_{in}$;

a single accept state being $B_{out}$; and transitions being:

$$v_{in} \xrightarrow{v} v_{out} \text{ if } v \in V;$$

and $$u_{out} \xrightarrow{l} v_{in} \text{ if } u \xrightarrow{l} v \in E \text{ where } l \in N \cup \{\Diamond\}.$$

10. The compiler of claim 2 wherein the traversal specification of said adaptive program satisfies the grammar:

$$D::=[A,]|D.D$$

and where the compilation algorithm has been modified to keep all automata deterministic, resulting in a polynomial time algorithm.

* * * * *

UNITED STATES PATENT AND TRADEMARK OFFICE
CERTIFICATE OF CORRECTION

PATENT NO.  : 5,946,490
DATED       : August 31, 1999
INVENTOR(S) : Karl Lieberherr et al.

It is certified that error appears in the above-identified patent and that said Letters Patent is hereby corrected as shown below:

Column 4,
Line 8, "Conglomerate $\xrightarrow{heat}$ Company" should read

-- Conglomerate $\xrightarrow{head}$ Company --.

Signed and Sealed this

Twelfth Day of March, 2002

Attest:

Attesting Officer

JAMES E. ROGAN
Director of the United States Patent and Trademark Office